June 25, 1963      B. H. ROWE      3,095,165
GAS COUPLING DUCT SYSTEM FOR FLUID SUPPORTED VEHICLE
Filed May 27, 1960      2 Sheets-Sheet 1

INVENTOR.
BRIAN H. ROWE
BY John F. Cullen
ATTORNEY

June 25, 1963          B. H. ROWE          3,095,165

GAS COUPLING DUCT SYSTEM FOR FLUID SUPPORTED VEHICLE

Filed May 27, 1960          2 Sheets-Sheet 2

INVENTOR.
BRIAN H. ROWE
BY John F. Cullen
ATTORNEY

United States Patent Office 3,095,165
Patented June 25, 1963

3,095,165
GAS COUPLING DUCT SYSTEM FOR FLUID SUPPORTED VEHICLE
Brian H. Rowe, Cincinnati, Ohio, assignor to General Electric Company, a corporation of New York
Filed May 27, 1960, Ser. No. 32,163
7 Claims. (Cl. 244—12)

The present invention relates to a coupling system for an air supported vehicle and, more particularly, to a gas coupling duct system for air supported vehicles such as VTOL aircraft.

In VTOL—vertical take-off and landing—aircraft a system that has come into prominence is the use of lift fans mounted in the vehicle wings or fuselage. By movement of large quantities of low pressure air through the fans, vertical lift may be obtained. Then the vehicle, if an aircraft, may continue in a vertical direction until suitable altitude is obtained at which time, or during the vertical movement, conversion can be made to horizontal movement by suitable jet reaction. This may be done by additional jet engines in the normal fashion or by diverting the fan discharge by louvers or suitable valves to provide a horizontal component. Obviously, in those vehicles such as aircraft, it is essential that balance be maintained at all times for stable operation. While the loss of a gas generator on a ground airborne vehicle, which rides on air a few inches above the ground illustrated by the Hovercraft and Levacar as typical, may not be serious, it could be fatal in an aircraft. During horizontal movement the normal ailerons provide roll control in a well known manner. However, in VTOL vehicles, during the hovering position, there is no movement of the air across the wing to provide this control and some means must be utilized to provide roll control in the event of failure of a gas generator or fan. Certain systems proposed have their advantages and disadvantages and any system is directed to the most direct and simple arrangement with the least amount of hardware such as ducting and a high degree of reliability. Also any control system should utilize components which do not enlarge the wings and add unnecessary weight to the aircraft. It is desirable also, when the ducting is simplified, to be able to transfer power from one fan to another in order to provide the roll control and, to do this, it is desirable to have a cross-coupling arrangement between the various fans so this power transfer may take place.

In VTOL aircraft it is anticipated that specifications will require continued flight during failure of any gas generator or with one engine out. With more than one engine out the aircraft must be able to maintain its balance and may or may not, depending on the capacity designed into it, continue to fly. However, it is essential that, even with two engines out, the plane must be able to come down gently and in a level position.

The present system is an improvement on the system shown and claimed in application Serial No. 32,162 filed concurrently herewith and assigned to the assignee of the instant invention. The instant system, utilizing a power transfer arrangement by which a control means provides scroll variation and selective admission of exhaust to the scrolls of the fans, permits roll correction to be made by the pilot in the event of engine failure. By this arrangement the amount of duct work interconnecting the fans and engines can be reduced and the resulting roll tendency can be easily compensated.

The main object of the present invention is to provide a gas coupling system for an air supported vehicle which uses the main fans for thrust modulation to obtain couples to control the airplane with no unbalanced lift.

Another object is to provide such a coupling system by which the aircraft can be balanced without an engine speed adjustment and which maintains the exit area of the gas generators constant.

A further object is to provide such a coupling system by ywhich roll control is obtained by changing the center of lift of the wing and this is done with a small amount of duct work between the fans.

A further object is to provide such a system by which an aircraft may be balanced with two engines out and which may operate with one engine out by redistributing the vertical thrust by power transfer to rebalance the aircraft.

Briefly stated, I provide a minimum duct work or pipping system for an air supported vehicle which has at least four gas generators and at least two fans and preferably four fans. Normally a pair of fans and a pair of gas generators will be mounted in each wing of an aircraft. The gas generators do not feed into a common duct and each fan is fed by at least two gas generators. Suitable control means are placed between the gas generators and fans so that redistribution or power transfer of the gas generators' output for roll control may be made by a simple stick control under the operation of the pilot.

While the specification concludes with claims particularly pointing out and distinctly claiming the subject matter which I regard as my invention, it is believed the invention will be better understood from the following description taken in connection with the accompanying drawing in which:

While the invention will be particularly described in connection with a VTOL aircraft, it should be appreciated that it is applicable to a ground air supported vehicle of the type that might run a few inches above the ground. However, the main application is in an aircraft of the VTOL type and it is in this setting that it will be described. Also, it will be apparent that the fans may be mounted in the aircraft in any suitable arrangement as will be apparent, the most common arrangement being wing mounted fans, although the invention is not restricted to such mounting.

The use of a common duct, into which the gas generators or engines all discharge creates some problems in some installations. By eliminating the common duct for all the gas generators the control problem of the gas generators is simplified. The reason for this is that back pressure on one gas generator in a common duct may affect other generators on the same line to change their operation. By avoiding the common duct system it is not necessary to match temperatures, pressures, gas flows, and speeds in order to bring them all on the line. By avoiding the common duct feature and making them independent of one another, i.e., independent in the sense they do not exhaust into a common duct, the control of the gas generators or engines is simplified.

Figure 1:
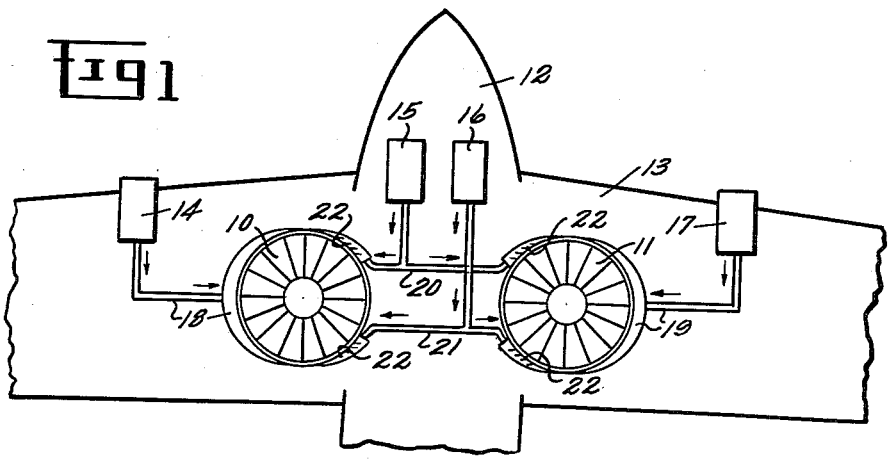
FIGURE 1 is a diagrammatic plan view showing of a two fan and four gas generator air supported vehicle.

Referring first to FIGURE 1, there is shown a diagrammatic plan view of a typical two fan-four gas generator installation illustrating the present invention. Such an installation may comprise fans 10 and 11, which are conventional tip turbo fans of the type shown in U.S. Patent 2,939,649, and are mounted in side-by-side relation within a fuselage or symmetrically disposed on opposite sides of fuselage 12 in wings 13 as shown. It will be understood that the movement of air vertically through fans 10 and 11 will provide vertical lift to the aircraft in the manner desired and that horizontal movement may take place by a number of means not important to the particular invention herein described.

In order to provide motion to fans 10 and 11 to pump air therethrough, suitable gas generators, which may be jet engines, and are called engines hereinafter for convenience only, are provided at 14, 15, 16 and 17 as shown. Engines 14 and 17 may be disposed outside of the fan in the wing 13 and engines 15 and 16 may be disposed within the fuselage 12 or the wings or any suitable equivalent arrangement.

In order to provide for power transfer and cross-coupling of the fans, suitable gas coupling ducts interconnecting the fans and engines are supplied. Such ducts are schematically shown in FIGURE 1 wherein engine 14 supplies duct 18 with direct exhaust gas to feed fan 10 through a scroll which is also represented by the numeral 18. Fan 11 is fed in a similar manner by engine 17 through duct 19. Fan 10 is additionally fed by engine 15 through duct 20 which is bifurcated to direct exhaust gas directly to both fans 10 and 11. In a similar manner engine 16 directs its exhaust gases through duct 21 to both fans. Suitable control means shown schematically as shutters or variable diaphragm means at 22 control the admission of selected predetermined proportions of exhaust gases to each of the fans. Control means 22 are disposed in the duct between the fans and the engines and preferably in the scroll for area variation in feeding the fan turbines. It can be seen that the fans and engines are disposed symmetrically about the centerline of the vehicle or the longitudinal centerline of the aircraft. Further, fans 10 and 11 are each fed by at least two engines, fan 10 being fed by engines 14 and 15 and fan 11 being fed by engines 16 and 17. Of course, fans 10 and 11 are also fed by engines 16 and 15 respectively.

In operation, in the normal hovering position, fan 10 receives the full output of engine 14 plus half of the output of engines 15 and 16 and fan 11 receives the full output of engine 17 plus half the output of engines 15 and 16. Thus, the aircraft is in balance and it is to be noted that none of the engines discharge into a common duct so are independent of each other in this sense and the exit area and speed of each engine may be maintained constant. Of course, other divisions of power can be obtained and the above is merely an example.

If engine 14 should fail, suitable action, which may be merely the stick operation by the pilot, can operate to open or close control means 22 to control gas admission or redistribute the exhaust gas to change the center of lift of the wing for roll control and rebalancing of the aircraft. In this situation, the fan 10 would receive no output from engine 14 which is out of operation and it would receive three-quarters of the output of engines 15 and 16. Fan 11 would receive all of the output of engine 17 and one-quarter of the output of each of engines 15 and 16. Thus, by this means of transferring the power, the aircraft is again balanced and its level attitude can be maintained. By suitably sizing the engines to provide excess power, it is possible to increase the power in the engines and thus increase the lift quickly on the loss of an engine. In the system just described, valving or control means are not required in ducts 18 and 19 or their scrolls since they are fed solely by engines 14 and 17. The elimination of this control mechanism simplifies the system just described. Again, other power division is obtainable by suitable variation of control means 22.

If both engines 14 and 15 went out, it can be seen that fan 10 would be fed by all of the output from engine 16 and fan 11 would be fed by the output from engine 17. Again, the aircraft is balanced although possibly sufficient lift is not now available to operate in the two engine-out condition. However, balance is maintained so that a safe landing can be made.

Figure 2:
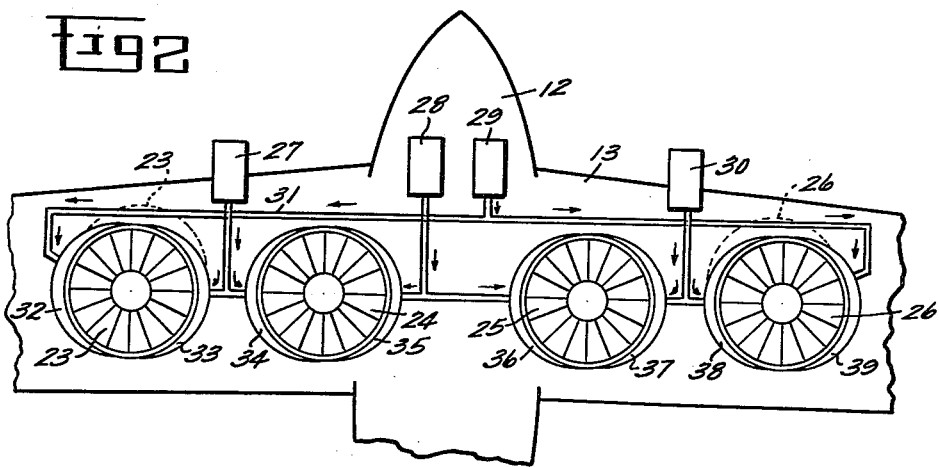
FIGURE 2 is a view similar to FIGURE 1 showing a four fan and four gas generator system.

Referring next to FIGURE 2, there is shown a four fan-four gas generator system again applied to a VTOL aircraft. In this system, fans 23, 24, 25, and 26 are provided in symmetrical disposition about the longitudinal centerline of the fuselage 12 and are placed in wings 13. Again, suitable engines 27, 28, 29 and 30 are provided. As shown, engines 27 and 30 may be provided in the wings and 28 and 29 in the fuselage or any suitable equivalent arrangement. For power transfer and cross-coupling even of the far-apart fans, it is to be noted that only a common single duct 31 is required to connect fans 23 and 26. By "common" it can be seen it is common to the fans but not the engines. This small common duct within the wing permits additional wing room for other components as well as permitting the wing chord to remain smaller to provide a higher aspect ratio wing for better aircraft performance. Again, suitable control means such as shutters 22 of FIGURE 1, omitted for clarity, are provided in the ducts between the fans and the engines and preferably in the scrolls 32 through 39. It can be seen that each fan is fed by at least two engines and two of the commonly fed fans are on opposite sides of the centerline.

In operation, in the normal hovering position, fan 23 will be fed by one-half the output of engine 27 and one-half the output of engine 29. Fan 24 will be fed by one-half the output of engine 27 and one-half the output of engine 28, and fan 25 will be fed by one-half the output of engine 28 and one-half the output of engine 30. Also, fan 26 will be fed by one-half the output of engines 29 and 30. It will be appreciated that the output of the engines may be divided by the control means provided within the scroll as described in FIGURE 1 to selectively divide the engine exhaust into two parts to feed the two fans in any desired division of power.

In a simple illustration of an engine-out condition, it will be assumed that engine 27 is out. In this case, fan 23 will be fed by three-quarters of the output of engine 29 and none of the output of engine 27. Fan 24 will be fed by three-quarters of the output of engine 28 and none of the output of engine 27 which is out. Fan 25 will be fed by the remaining quarter of the output of engine 28 and one-half the output of engine 30 and fan 26 will be fed by the remaining half of the output of engine 30 and the remaining quarter of the output of engine 29. Since four fans must be fed by three engines, it can be seen that each fan can receive only three-quarters of the total normal output available. From the example just given it can be seen that each fan receives exactly this amount by suitable power transfer between the fans by the cross-coupling system illustrated and the aircraft is balanced.

While flight may or may not be possible with two engines out, it is possible to maintain aircraft balance as will now be illustrated. Let us assume that engines 27 and 28 are out. Under this condition, fan 23 will receive all the output of engine 29 and none of the output of engine 27. Fan 24 will receive none of the output of engine 27 and none of the output of engine 28. Fan 25 likewise will receive none of the output of engine 28 and none of the output of engine 30 and fan 26 will receive all of the output of engine 30 and none of the output of engine 29. Thus, two of the fans are shut down and balance is maintained by the proper moment or couple on fans 23 and 26. Similar other two-engine-out conditions can be tolerated with balance of the aircraft.

While only roll control has been illustrated in this figure, it will be appreciated that both roll and pitch control may be maintained by the same system by merely moving fans 23 and 26 as an example, to an off position as shown dotted in the figure. The same coupling arrangement is provided and the same results obtained but, by the off-set arrangement, both roll and pitch control may be maintained.

Figure 3:
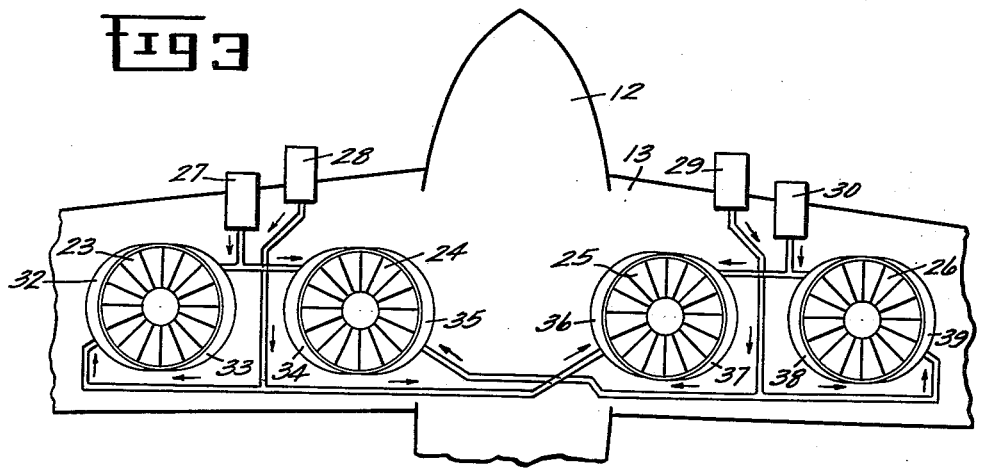
FIGURE 3 is a view similar to FIGURE 2 showing a modified four fan and four gas generator system.

Referring next to FIGURE 3, a modification similar to FIGURE 2 is shown wherein the gas generators or engines are all mounted in the wings. This system is identical except that the new placement of the engines may use a different connecting duct work and like numerals have been applied to this figure. The only difference, as can be seen, is that engine 28 now connects fans 23 and 25 on opposite sides of the centerline and engine 29 connects fans 24 and 26 in place of the arrangement previously shown.

In operation, in normal hovering position, all fans receive half their output from each engine connected thereto. In typical engine 27 out condition, fan 23 will receive three-quarters of the output of engine 28 and none of the output of engine 27. Fan 24 will receive none of the output of engine 27 and three-quarters of the output of engine 29. Fan 25 will receive the remaining quarter of the output of engine 28 and one-half of the output of engine 30 and fan 26 will receive the remaining quarter of the output of engine 29 and the remaining half of the output of engine 30 and again the aircraft is balanced. Similarly, in the two engine-out condition, balance is maintained.

Figure 4:
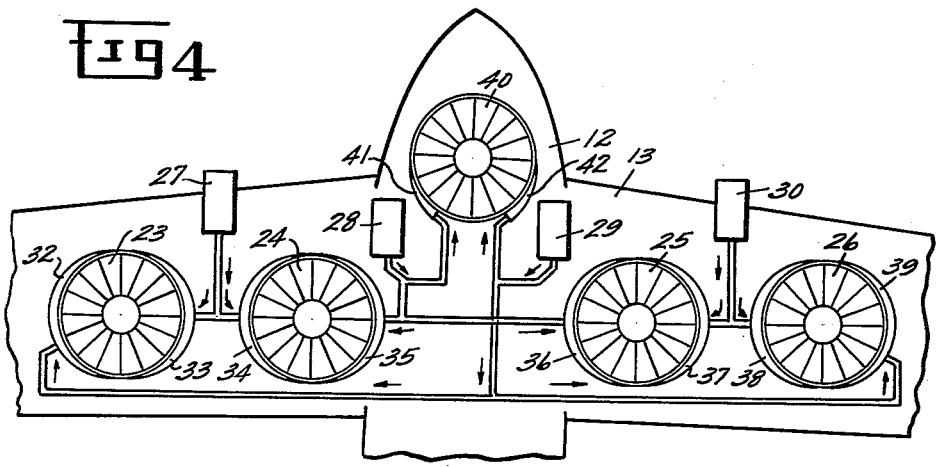
FIGURE 4 is a five fan and four gas generator system.

Referring next to FIGURE 4, a system employing five fans and four gas generators is shown in which the fifth fan 40 mounted on the centerline and spaced from the center of gravity may be employed in the fuselage 12 as shown for pitch control. The system is identical, and like numerals have been applied, to that described in FIGURE 2 with the exception that both engines 28 and 29 now have another duct feeding into scrolls 41 and 42 respectively. This merely redistributes the exhaust from these two engines because of the addition of an extra fan. Thus, with five fans and four gas generators it can be seen that each fan will receive only eight-tenths of that which it would receive if there were an equal number of gas generators for fans and each fan is directly driven by exhaust gases from the generators.

In operation, in the normal hovering position, fan 23 receives eight-tenths of the output of engine 27 and the control mechanism 32 from engine 29 is closed off. Fan 24 receives six-tenths of the output of engine 28 and the remaining two-tenths of the output of engine 27. Fan 25 receives no output from engine 28 by closing the control means in scroll 36 and receives eight-tenths of the output from engine 30. Fan 26 receives the remaining two-tenths of the output from engine 30 and sixth-tenths of the output from the engine 29, and fan 40 receives the remaining four-tenths of the output from engine 28 and the remaining four-tenths of the output from engine 29. Again, it can be seen that the aircraft is balanced.

In a single engine out condition, let us assume that engine 27 is out of commission. In this case, fan 23 will receive six-tenths of the output of engine 29 and none of the output of engine 27. Fan 24 will receive six-tenths of the output of engine 28 and none of the output of engine 27. Fan 25 will receive one-tenth of the output of engine 28 and one-half of the output of engine 30. Fan 26 will receive the other half of the output of engine 30 and one-tenth of the output of engine 29, and fan 40 will receive the remaining three-tenths of the output of engine 28 and the remaining three-tenths of the output of engine 29. Thus again, the aircraft is maintained in balance in both roll and pitch with one engine down.

It will be appreciated that any combination may be obtained by the simple power transfer ducting arrangement or coupling system shown by which the cross-coupling permits a simple control and horizontal flight at all times. No problems are created by the engines' discharging into a common duct since none of the engines discharge into a common duct and are therefore independent and disconnected from one another.

While I have hereinbefore described a preferred form of my invention, obviously many modifications and variations of the present invention are possible in the light of the above teachings. It is therefore to be understood that within the scope of the appended claims, the invention may be practiced otherwise than as specifically described.

I claim:

1. A gas coupling system for an air supported vehicle comprising, at least four gas generators and at least two fans, ducts interconnecting the fans and gas generators whereby the gas generator exhaust drives the fans, said fans and gas generators being disposed symmetrically about the vehicle centerline and connected for fan operation at all times on both sides of the centerline, at least two gas generators being duct connected to more than one fan, control means to selectively divide the output of the two gas generators between the fans, and all of said gas generators being independent of each other.

2. A gas coupling system for an air supported vehicle comprising, at least four gas generators and at least two fans, ducts interconnecting some of the fans and gas generators whereby the gas generator exhaust directly drives the fans, said fans and gas generators being disposed symmetrically about the longitudinal centerline of the vehicle and connected for fan operation at all times on both sides of the centerline, and each of two of said gas generators having a duct connecting it to more than one fan, control means between said last mentioned connected fans and gas generators to selectively divide the exhaust gas to said fans in a predetermined proportion, and all of said gas generators being independent of each other.

3. A gas coupling system for a VTOL aircraft comprising, at least four gas generators and at least two wing mounted fans, said gas generators and fans being symmetrically disposed about the aircraft longitudinal centerline, ducts interconnecting the fans and gas generators whereby the gas generator exhaust directly drives the fans, at least two of the gas generators being connected to more than one fan for fan operation at all times on both sides of the centerline, control means between said two gas generators and connected fans to divide the exhaust gas to said fans in a predetermined proportion, and all of said gas generators being independent of each other.

4. A gas coupling system for a VTOL aircraft comprising, at least four gas generators and four wing mounted fans, said fans and gas generators being disposed symmetrically about the aircraft longitudinal centerline, ducts connecting each gas generator with at least two fans for fan operation at all times on both sides of the centerline, control means between said fans and gas generators to selectively divide the gas generator exhaust to the fans in a predetermined proportion, and all of said gas generators being independent of each other.

5. A gas coupling system for a VTOL aircraft comprising, at least four gas generators and four wing mounted fans symmetrically disposed about the fuselage longitudinal centerline, ducts connecting each gas generator in common with at least two fans for direct drive of said fans by exhaust gas, at least two of said commonly fed fans being on opposite sides of the centerline, control means between said fans and gas generators to selectively divide the gas generator exhaust to the fans in a predetermined proportion, and all of said gas generators being independent of each other.

6. A gas coupling system for a VTOL aircraft comprising, at least four gas generators and four wing mounted fans symmetrically disposed about the fuselage longitudinal centerline, ducts interconnecting the gas generators and fans so that each fan is directly fed and driven by exhaust gas from at least two gas generators and each gas generator is common to and feeds at least two fans, two of said commonly fed fans being disposed on opposite sides of the centerline, control means between said fans and gas generators to selectively divide the gas generator exhaust to the fans in a predetermined proportion, and all of said gas generators being independent of each other.

7. A gas coupling system for a VTOL aircraft comprising, at least four gas generators and four wing mounted fans symmetrically disposed about the fuselage centerline, and additional fan means disposed on the centerline and spaced from the aircraft center of gravity, ducts interconnecting the gas generators and fans so that each fan is directly fed and driven by exhaust gas from at least two gas generators and each gas generator is common to and feeds at least two fans, two of said commonly fed fans being disposed on opposite sides of the centerline, control means between said fans and gas generators to selectively divide the gas generator exhaust to the fans in a predetermined proportion and all of said gas generators being independent of each other.

References Cited in the file of this patent

UNITED STATES PATENTS

| | | |
|---|---|---|
| 2,899,149 | Breguet | Aug. 11, 1959 |
| 2,939,649 | Shaw | June 7, 1960 |
| 2,990,138 | Shaw | June 27, 1961 |

OTHER REFERENCES

"Convertible Turbojet Engines for Aircraft," I.A.S. Report No. 59—60, Jan. 29, 1959, N.Y.